Jan. 16, 1968 B. CAMOLETTI ETAL 3,363,370
PREFABRICATED ELEMENTS OF MOULDED MATERIAL
FOR THE CONSTRUCTION OF DWELLINGS
Filed Nov. 13, 1964 4 Sheets-Sheet 1
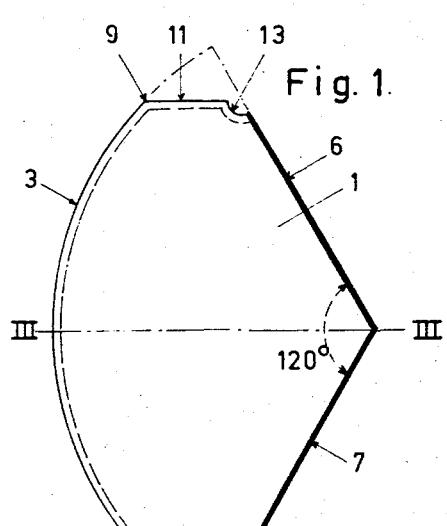
Fig. 1.
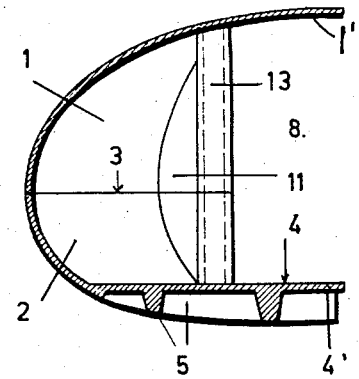
Fig. 3.
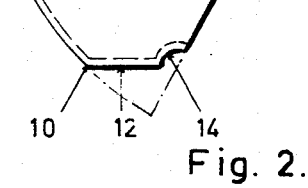
Fig. 2.
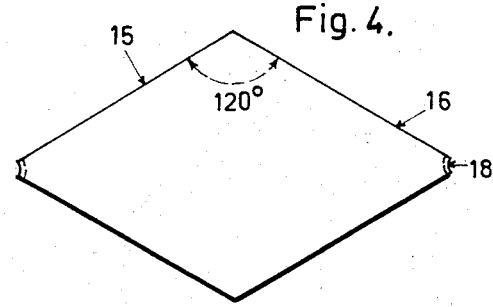
Fig. 4.
Fig. 5.
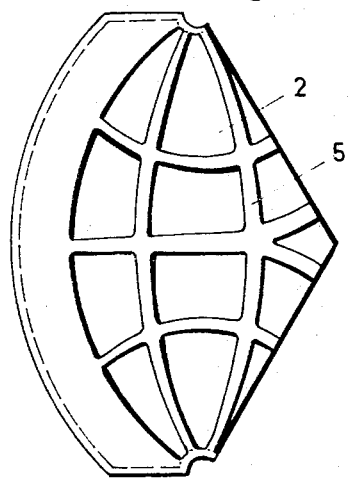
Fig. 7.
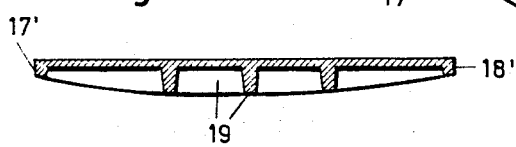
Fig. 6.
INVENTORS:
BRUNO CAMOLETTI,
PASCAL HÄUSERMAN, ERICH HOECHEL
by Jacob L. Rollin
ATTORNEY

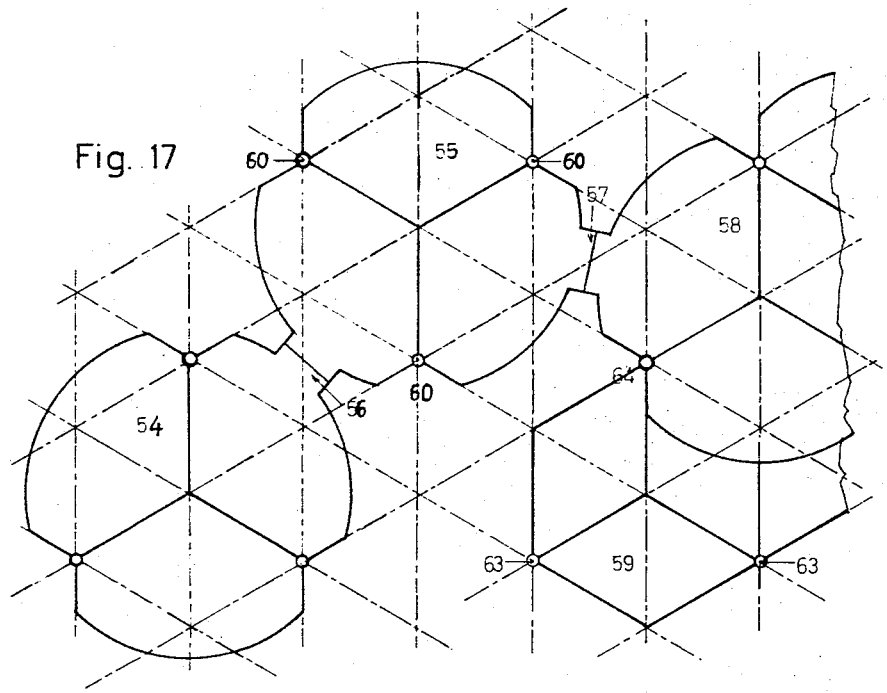
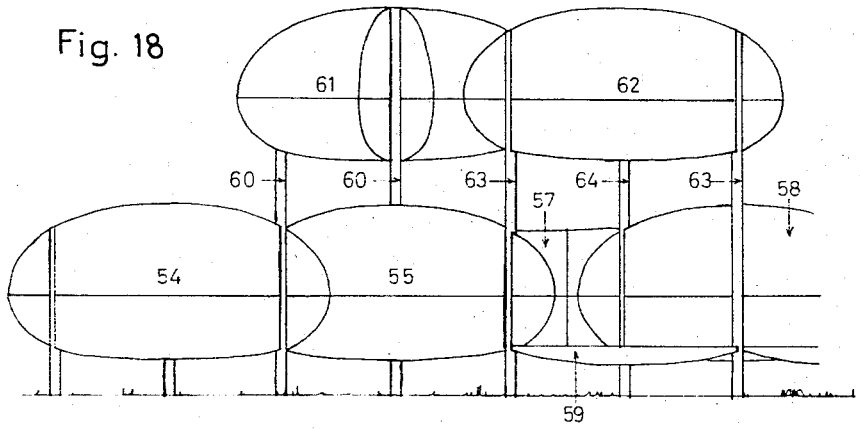

United States Patent Office 3,363,370
Patented Jan. 16, 1968

1

3,363,370
PREFABRICATED ELEMENTS OF MOULDED
MATERIAL FOR THE CONSTRUCTION OF
DWELLINGS
Bruno Camoletti, 1 Rue Etienne Dumont, Geneva, Switzerland; Pascal Häusermann, Chateau de Minzier par Frangy, Hte. Savoie, France; and Eric Hoechel, 5 Rue Henry Mussard, Geneva, Switzerland
Filed Nov. 13, 1964, Ser. No. 411,049
Claims priority, application Switzerland, Nov. 22, 1963, 14,444/63
7 Claims. (Cl. 52—80)

The present invention relates to a set of prefabricated elements of moulded material for the construction of dwellings.

The set of elements comprises a plurality of sets of ellipsoid segments of molded material, secured to one another, each of said sets comprising upper and lower ellipsoid segments corresponding to an angle of 120°, the upper segment extending above a horizontal plane and the lower segment extending below said plane, the perimeter of said ellipsoid segments in said horizontal plane having an arcuate edge of constant radius, the portion of said perimeter opposite said arcuate edge comprised of two linear edge portions of equal length extending from the center of said arcuate portion at an angle of 120° to each other; and said perimeter having connecting edges intermediate said arcuate and linear edge portions which are in spaced parallel relation to the bisector of said angle of 120°, and said connecting edges having vertical grooves for receiving supporting pillars therein.

Other complementary elements which will be dealt with in the course of the following description may be added to the already defined segments.

Any light, but sufficiently resistant material which can be molded, may be used for making construction elements according to the present invention. Such a material may also be used with on such a base as for instance, a wire netting. In particular, it will be possible to form the segments from a polyurethane foam film reinforced on its two faces with stratified polyester.

The drawing shows an embodiment of a pair of segments, as well as complementary elements and variables, and various assembly examples of these elements for forming dwellings.

FIG. 1 shows an upper segment in horizontal projection, i.e. seen from above.

FIG. 2 shows the corresponding lower segment, seen from below.

FIG. 3 is a vertical section of the two assembled segments taken on line III—III of FIG. 1.

FIG. 4 is a top view of an upper complementary element.

FIG. 5 is a section thereof on a plane drawn through its great axis.

FIG. 6 is a top view of a lower complementary element.

FIG. 7 is a section thereof on a plane drawn through its great axis.

2

Figure 14:
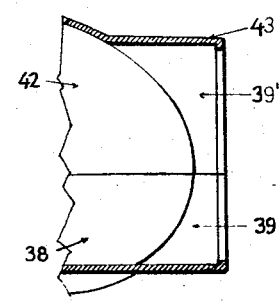

FIG. 14 is a partial section thereof through line XIV—XIV, i.e. through the door center.

Figure 15:
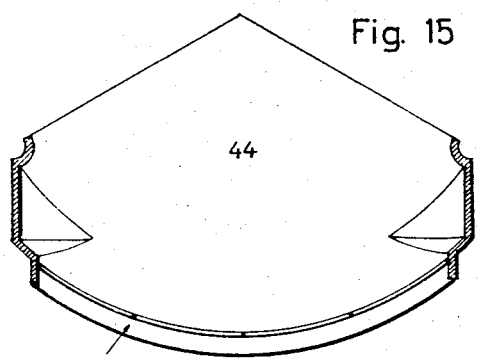

FIG. 15 is a top view of a lower element in a variable comprising a large glazed bay.

Figure 16:
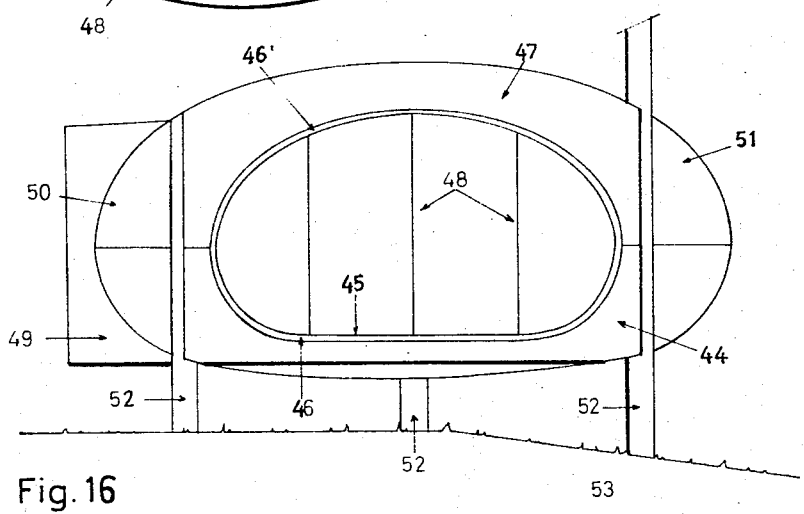

FIG. 16 is a view in elevation of a dwelling formed by a basic cell with side door and large glazed bay (according to FIG. 15).

FIG. 17 is a diagram according to which it is possible to form a great variety of dwelling assemblies carried out by means of basic elements and complementary elements.

FIG. 18 shows in elevation, an example of an assembly according to FIG. 17.

Referring now to FIGS. 1–3 a pair of so-called basic elements is made of one upper segment 1 (seen from above, FIG. 1) and one lower segment 2 (seen from below in FIG. 2) as an assembly partly shown in the section of FIG. 3.

This assembly forms a shell unit following practically the exact shape of a spherical lune of ellipsoid of revolution embracing an arc of 120° (see FIG. 1). The upper half-shell 1 extends above the equator 3 (see FIG. 3) and the lower half-shell 2 beneath the latter. The latter half-shell serves partially as a dwelling floor, for which reason it is in part planar, at 4, and reinforced by ribs 5, being incorporated in the profile of ellipsoid of revolution of the whole.

FIG. 1 shows a pair of assembled segments.

It is defined, on the one hand, by the sides 6 and 7 of an angle of 120°, thus explaining the empty space 8 of FIG. 3. It is delimited, on the other hand, by an arc of constant radius 3, between the points 9 and 10. Finally, it is still delimited by two connecting edges 11 and 12 parallel to the bisector III—III of the angle of 120°, these edges connecting the ends 9 and 10 of the arc 3 to the sides 6 and 7 of the angle and having grooves 13, 14, perpendicular to the projection plan and capable, as it will be seen later on, of surrounding in part a pillar supporting the whole. Here, these grooves are of circular profile.

The empty space 8 in FIG. 3 is formed between the roof portion 1' of the upper segment, a floor portion 4' and the grooves (here 13).

The upper complementary element according to FIGS. 4 and 5 has, seen from above, the form of a rhomb, the sides of which, 15, 16, have the length and the configuration already referred to of the equal sides 6 and 7 or more exactly the edges delimiting the angle of 120° of the upper segment 1. The sides 15 and 16 form between them an angle of 120°. At the ends corresponding to the acute angles of the rhomb, there are provided portions of sleeves 17, 18 of inner radius corresponding to that of the grooves 13 and 14. It will further appear that the complementary element already described is a portion of a cylinder designed to serve as a roof.

The lower complementary element according to FIGS. 6 and 7 in the form of a rhomb of horizontal projection identical to that of the previous one, is a floor element, for which reason it is flat and reinforced by ribs 19. Likewise, it terminates at both ends of its great axis, in sleeve portions 17' and 18'.

Having thus described the upper and lower basic elements and the possible upper and lower complementary elements, the following are some examples of dwellings which can be achieved by assembling the latter.

Figure 8:
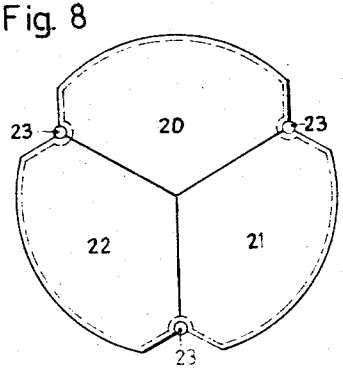
FIG. 8 is a plan-view of a dwelling obtained by assembling three pairs of prefabricated elements according to the invention and forming a basic cell.

In FIG. 8, there are shown three pairs of connected segments.

Here, the three pairs of segments appear in plan, i.e. three basic elements 20, 21, 22 are coupled. When deducting the thickness of the walls, an available dwelling volume within the broken line becomes available. The assembling, which has to be tight, will be achieved by means of adequate material.

The vertical rectilinear grooves referred to when describing the elements (13, 14 in FIG. 1) allow the passage of three pillars 23. For example, they will be made of metallic tubes which are not only used for bracing the assembly but for supporting the whole which may thus be located at a certain height from the floor. The dwelling is mounted on piling, the length of which may be determined according to the needs or wishes.

This assembly of three pairs of segments, to be carried out as simply as possible, will be called a basic cell.

Figure 9:
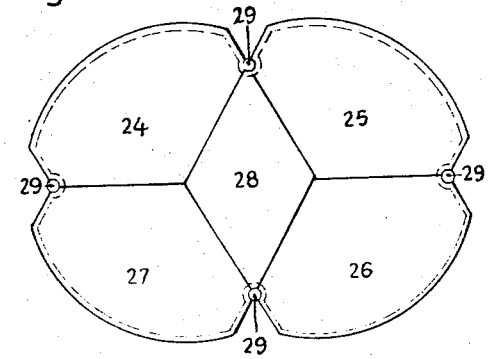
FIG. 9 is a plan-view of a dwelling formed by a basic shell enlarged by the addition of a pair of complementary elements.

By adding to four basic elements a complementary roof or vault element (FIGS. 4 and 5) and a complementary floor element (FIGS. 6 and 7) the enlarged basic cell of FIG. 9 will be obtained.

The pairs of segments bear the references 24, 25, 26 and 27 and surround the complementary rhombic vault element 28, on the opposite side of which is a complementary floor element of like profile. This construction relates to the use of four pillars 29.

In the place of the latter, the half-shells form, above and under the horizontal plane, sleeve portions surround them in part along the whole height (see 13 in FIG. 3). At the complementary elements, only the sleeve portions 17, 18, 17', 18' (see FIGS. 4 and 7) rest against the pillars. Their completion by independent sleeve sections filling the remaining free space will prove advantageous.

Figure 10:
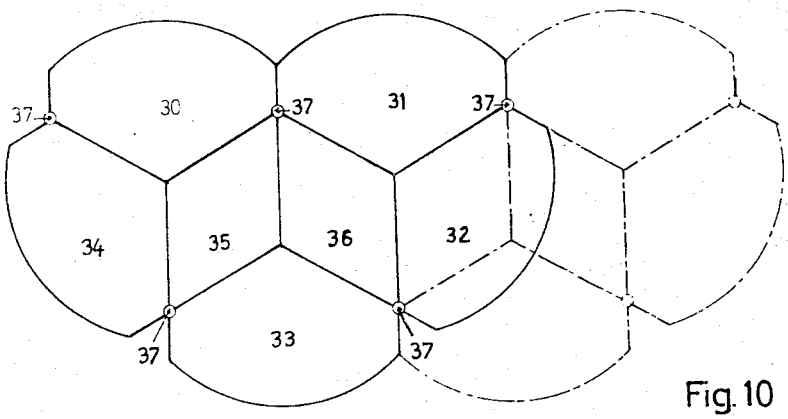
FIGS. 10 and 11 are plan-views of dwellings explaining other assembling possibilities of the basic elements and other complementary elements.

The part of the FIG. 10 in full lines shows that a still more spacious dwelling may be obtained when making use of five basic elements 30, 31, 32, 33, 34, two upper complementary elements 35, 36 and, of course, two lower complementary elements, as well as five pillars 37. The dotted lines in FIG. 10 show finally how it is possible to increase that space in a given direction, this moreover without limit. This is a form of linear extension of the construction.

It is also possible to achieve larger spaces in the form of peripherial extension.

Figure 11:
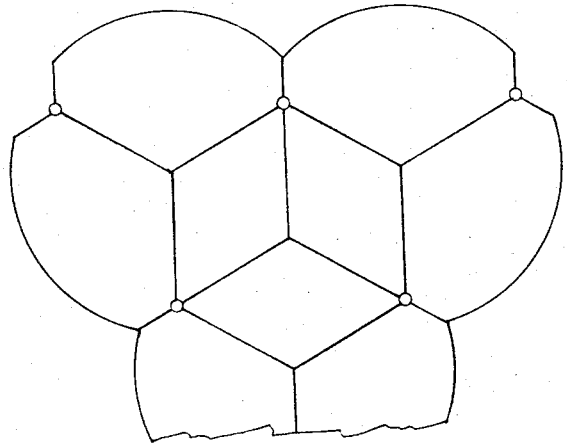

FIG. 11 is a self-explanatory example showing the use of six basic elements, three pairs of complementary elements and six pillars (one not visible in the drawing).

Assuming that a dwelling of the basic cell type according to the example of FIG. 8 may measure inside about 6 m. in its diameter with a flat floor part of 5 m. diameter and a height in the center of 2.70 m. the length obtained in consequence of the disposition according to the example of FIG. 9 would be, all other values being equal, of 8.30 m.

It is of course possible to divide the interior at will by means of walls arranged accordingly.

The dwellings thus obtained will of course be fitted with openings, doors, windows, etc. FIGS. 12 to 16 show possible arrangements given by way of example.

Figure 12:
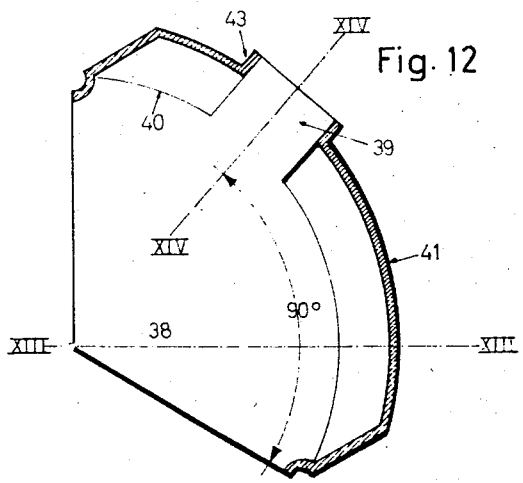
FIG. 12 is a top view of a lower element in a modification comprising a door opening laterally outwards.
Figure 13:
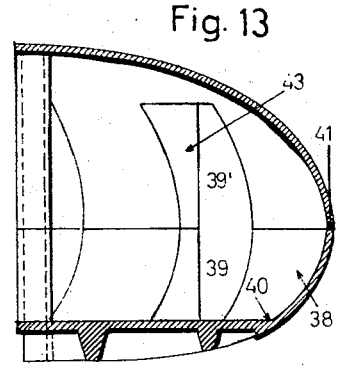
FIG. 13 is a section thereof through line XIII—XIII, the corresponding upper element being in position.

For instance, a door may be arranged as shown in the FIGS. 12 to 14.

The FIG. 12 corresponds to a plan-view of a lower half-shell 38 in the wall of which is provided the opening of a door 39 extending from the edge 40 of the flat floor to the level of horizontal plane 41. Similarly, the upper half-shell 42 (see FIGS. 13 to 14) will be holed at 39'. By their superposition, these two openings will form the door, as is clearly evident from the sections of the last two mentioned figures.

Owing to the convex form of the outer side wall, the opening of the door is formed so that it has to be surrounded by an outer rectilinear vertical frame 43, i.e. ending according to an outer vertical plan, and a part of which will be integral with the upper half-shell and the other with the lower half-shell. This frame does not only protect the door opening laterally, but forms a kind of eave for the latter, projecting roof which could still be enlarged, for instance in its upper area.

The FIGS. 15 and 16 show in the same way how to arrange a relatively large size glazed bay.

The lower half-shell 44 of the FIG. 15 which appears again in FIG. 16, presents a wide opening 45, surrounded (like the door) by a frame 46. The corresponding upper half-shell 47 (visible in FIG. 16) comprises the excess 46' of said frame, surrounding the corresponding complementary part of the bay opening made in this half-shell.

Vertical bars 48 divide the bay and separate the windows thereof which they support.

FIG. 16 corresponds to a view in elevation of a basic cell comprising, beside the aforesaid bay, a door 49.

At 50 and 51, the side bows of the two pairs of shells are located behind the pair 44–47.

Finally, FIG. 16 shows in elevation, how the construction is sustained by three pillars 52 above the floor 53.

The description is not limitative; i.e., that the described elements may be holed according to the needs of all the openings proper to constitute doors, windows, chimney flues, to ensure ventilation, etc.

Evacuation, water, gas, electricity piping may also pass without loss of space through the interior of the pillars.

FIG. 17 is a plan designed to show the manner in which the dwellings obtained by means of the described elements may be appended in the most varied ways.

The two basic cells 54, 55, which appear therein are united by juxtaposition of the frames 56 of their conveniently oriented doors, i.e. by dividing the arc of 120° of the corresponding pair of shells into two parts of 30° and 90°, respectively, as it is moreover the case for the example of FIG. 12.

The basic cell 55 is in turn coupled by the doors 57 with the enlarged basic cell 58, partly represented.

Finally, at 59, some juxtaposed lower complementary elements form the floor of a terrace extending in front of the dwelling 58. By using basic lower elements only, such as that of FIG. 2, it is possible to constitute terraces or hanging gardens.

FIG. 18 is a view in elevation, whose lower part corresponds to the already described FIG. 17.

In addition to the unlimited possibilities of extending the construction horizontally in all directions, the prefabricated elements according to the invention allow a similar development in height. This is shown in the upper part of the view in elevation of FIG. 18.

By making use of the same pillars 60, a basic cell 61 superposed to the cell 55 appears therein. The latter is connected by a door not shown in the drawing, to the cell 62 located above the terrace 59 and propped by the two pillars 63 of the latter, as well as by the pillar 64 sustaining at the same time the lower dwelling 58. Thus, the cell 62 forms a roof above the terrace 59.

It would be of course possible to raise still further the construction, in short, to provide for all the desired combinations.

The access to the various cells, terraces, etc. will be facilitated by stairs, or lifts integral or non integral with the posts network of the whole.

What we claim is:

1. In a prefabricated dwelling, a plurality of sets of ellipsoid segments of molded material, secured to one another, each of said sets comprising upper and lower ellipsoid segments corresponding to an angle of 120°, the upper segment extending above an horizontal plane and the lower segment extending below said plane, the perimeter of said ellipsoid segments in said horizontal plane having an arcuate edge of constant radius, the portion of said perimeter opposite said arcuate edge comprised of two linear edge portions of equal length extending from the center of said arcuate portion at an angle of 120° to each other; and said perimeter having connecting edges intermediate said arcuate and linear edge portions which are in spaced parallel relation to the bisector of said angle of 120°, and said connecting edges having vertical grooves for receiving supporting pillars therein.

2. In a prefabricated dwelling according to claim 1, three of said sets of ellipsoid segments arranged with said linear portions adacent one another to form a circular structure of substantially 360°.

3. In a dwelling according to claim 1, two pairs of said sets arranged opposite one another and forming a rhomb-shaped space therebetween, a top lozenge-shaped member for covering said space above said sets and a bottom lozenge-shaped member below said space, serving as a floor member.

4. In a dwelling according to claim 1, a plurality of said sets laterally arranged to form rhomb-shaped interstices therebetween.

5. In a dwelling according to claim 1, a plurality of said sets laterally arranged along one level and a plurality of said sets arranged on another level above said one level.

6. In a dwelling according to claim 1, at least one of said sets being provided with a door opening.

7. In a dwelling according to claim 1, a plurality of supporting posts received in said recesses.

References Cited
UNITED STATES PATENTS 3,172,392    3/1965    Schultz _____ 52—80

OTHER REFERENCES

Prefabrication, August 1957 (pp. 452–456).

FRANK L. ABBOTT, *Primary Examiner.*

C. G. MUELLER *Assistant Examiner.*